United States Patent Office 3,267,166
Patented August 16, 1966

3,267,166
SORPTION PROCESS
Herman S. Bloch, Skokie, and Ernest L. Pollitzer, Hinsdale, Ill., assignors to Universal Oil Products Company, Des Plaines, Ill., a corporation of Delaware
No Drawing. Filed July 28, 1965, Ser. No. 475,566
7 Claims. (Cl. 260—671)

This application is a continuation-in-part of our copending application Serial No. 145,458, filed October 16, 1961, and now abandoned.

This invention relates to a process for the removal of boron halide and trace quantities of water from an aromatic hydrocarbon liquid recycle stream containing the same by contacting said recycle stream with a boron halide sorbent comprising a metal halide. Still more particularly, this invention relates to a process for the removal of boron halide and trace quantities of water from an aromatic hydrocarbon liquid recycle stream by contacting said recycle stream with a boron halide sorbent comprising a metal halide, thereby selectively sorbing at least a portion of said boron halide with said metal halide, subsequently recovering substantially anhydrous boron trifluoride from said metal fluoride, then dehydrating the water-containing effluent from said sorbing step, and separately returning the thus purified recycle stream and the substantially anhydrous boron trifluoride to the reaction zone.

The term "sorption" means a mechanism by which at least one component of a mixture selectively combines in some form with the solid or solids with which the mixture is contacted; such mechanisms may be adsorption, absorption, clathration, occlusion or chemical reaction and all of these mechanisms are generically designated herein as "sorption."

We have found that in the production of alkylated aromatic hydrocarbons utilizing a boron trifluoride-modified substantially anhydrous inorganic oxide, alkylatable aromatic hydrocarbon, olefin-acting compound, and boron trifluoride, trace quantities of water sometimes are encountered in process streams per se or as coordination compounds of the boron trifluoride. These trace quantities of water are most often found in the aromatic hydrocarbon liquid recycle process stream. The term "trace quantity of water" by way of definition means that quantity of water having a concentration of less than about 0.10 weight percent of said process stream.

The principal object of the present invention is to provide a sorption process for the efficient and economical separation of the boron trifluoride and trace quantities of water contained in said hereinabove-mentioned process stream, and subsequently separately recovering for re-use substantially anhydrous boron trifluoride and dehydrated aromatic liquid hydrocarbon inasmuch as drying of such aromatic liquid hydrocarbon recycle streams is not feasible by conventional means when boron trifluoride and water are present. Another object of this invention is to provide a process whereby the halide and water can be separated and removed continuously from the hereinbefore mentioned process streams without appreciable consumption and loss of the recovered purified liquid hydrocarbon recycle stream. Other objects of this invention will be set forth hereinafter as part of the specifications and in the accompanying examples.

As set forth above, drying of an aromatic hydrocarbon liquid recycle stream is not feasible by conventional means when both boron trifluoride and water are present in such an aromatic hydrocarbon process stream. Prior art investigators have treated many anhydrous systems with a metal halide to achieve their particular goals, but these investigators have found that, for example, in the removal of anhydrous boron trifluoride from an olefinic hydrocarbon containing the same, extraneous means to achieve the desired removal with the metal halide must be utilized. For example, it has been found necessary to use various ethers to form complexes with the boron trifluoride for removal of the thus-formed complex with the metal halide. These same investigators have stated in the prior art that in a so-called wet method of recovery of a boron halide, it is not possible to recover boron trifluoride as such for further re-use.

It is however an object of our invention to recover boron trifluoride for further re-use even though water and aromatic hydrocarbon are originally present in admixture with the boron trifluoride in a recycle aromatic hydrocarbon process stream.

Also, some investigators have utilized metal halides to dehydrofluorinate or remove organic fluorine from isoparaffin alkylates. However, these alkylates are also anhydrous due to the manner in which the alkylate was formed.

Further, some investigators have utilized metal halides in treating a water-boron halide complex in the total absence of any organic compound to recover the boron halide in an anhydrous form. These investigators in using a strictly aqueous system without the presence of any organic compound, and especially without an aromatic hydrocarbon, were totally unaware of the difficulties that arise when water, boron halide and aromatic hydrocarbon are in admixture in a single process stream and it is desired to recover for re-use substantially all the purified anhydrous boron halide and substantially all the dehydrated aromatic hydrocarbon for re-use in the process. As stated before, conventional means of purification of such a stream are not feasible due to consumption and use of the desired recycle products in the purification process itself so that such a process is obviously commercially unattractive.

It is our invention that allows for recovery and re-use of substantially all the boron trifluoride, and substantially all the liquid aromatic hydrocarbon when boron trifluoride, water and aromatic hydrocarbon are all present within the same process stream. The prior art does not recognize the problem we have solved nor does the prior art teach a solution to the problem.

Therefore, in one embodiment, our invention relates to the alkylation of an aromatic hydrocarbon in a reaction zone in the presence of boron halide and a boron halide-modified substantially anhydrous inorganic oxide, and comprises the process of withdrawing the resultant effluent from the reaction zone and separating therefrom an aromatic hydrocarbon liquid recycle stream containing boron halide and trace quantities of water, contacting said recycle stream with a boron halide sorbent comprising a metal halide, selectively sorbing at least a portion of said boron halide with said metal halide at a temperature at which the hydrate of the resulting metal haloborate is unstable and said metal haloborate is stable, subsequently recovering substantially anhydrous boron halide from said metal haloborate at a temperature above said sorption temperature, then dehydrating the water-containing effluent from said sorbing step, and separately returning the thus purified recycle stream and the substantially anhydrous boron halide to the reaction zone.

Another embodiment of our invention relates to the alkylation of an aromatic hydrocarbon in a reaction zone in the presence of boron trifluoride and a boron trifluoride-modified substantially anhydrous inorganic oxide, and comprises the process of withdrawing the resultant effluent from the reaction zone and separating therefrom an aromatic hydrocarbon liquid recycle stream containing boron trifluoride and trace quantities of water, contacting said recycle stream with a boron trifluoride sorbent comprising a metal fluoride, selectively sorbing at least a portion of said boron trifluoride with said metal fluoride at a temperature at which the hydrate of the resulting metal haloborate is unstable and said metal haloborate is stable, subsequently recovering substantially anhydrous boron trifluoride from said metal fluoborate at a temperature above said sorption temperature, then dehydrating the water-containing effluent from said sorbing step, and separately returning the thus purified recycle stream and the substantially anhydrous boron trifluoride to the reaction zone.

A specific embodiment of our invention relates to the alkylation of an aromatic hydrocarbon in a reaction zone in the presence of boron trifluoride and a boron trifluoride-modified substantially anhydrous inorganic oxide, and comprises the process of withdrawing the resultant effluent from the reaction zone and separating therefrom a liquid benzene recycle stream containing boron trifluoride and trace quantities of water, contacting said recycle stream with a boron trifluoride sorbent comprising calcium fluoride, selectively sorbing at least a portion of said boron trifluoride with said calcium fluoride at a temperature of from about 75° C. to about 300° C. at which temperature the hydrate of the resulting calcium fluoborate is unstable and said calcium fluoborate is stable, subsequently recovering substantially anhydrous boron trifluoride from said calcium fluoborate at a temperature above said sorption temperature, then dehydrating the water-containing effluent from said sorbing step, and separately returning the thus purified benzene recycle stream and the substantially anhydrous boron trifluoride to the reaction zone.

Other embodiments of the present invention will become apparent in considering the specification as hereinafter set forth.

As set forth hereinabove, the present invention relates to a selective sorption process for the separation of boron halide and trace quantities of water from an aromatic hydrocarbon liquid recycle stream utilizing a boron halide sorbent comprising a metal halide as the selective sorbing agent. The trace quantities of water, as hereinbefore mentioned, sometimes are encountered per se or as coordination compounds of the boron halide. These compounds have sometimes been encountered as the hydrates of boron trifluoride including boron trifluoride monohydrate, boron trifluoride dihydrate, boron trifluoride trihydrate, etc. In addition to the hereinabove mentioned compounds, other compounds comprising boron, hydrogen, oxygen and fluorine, may be present as aforesaid, such as, for example, $B(OH)_2F$, $B(OH)F_2$, etc. Intermediate solid but volatile materials, such as $(BOF)_x$ polymers, where $x$ may be from about 3 to 10 or more are also sometimes encountered. These compounds are also sometimes encountered in combination with each other, with water, or with boron trifluoride, as well as by themselves. It will be appreciated by those skilled in the art that the foregoing list of compounds has by no means exhausted the total number of compounds that may form reversibly when water and boron halide are present in an aromatic hydrocarbon liquid recycle process stream. However, it is our desire to remove the trace quantities of water before these coordination compounds accumulate in any large amount in the process.

Many suitable metal halides are utilizable as selective sorption agents in the process of this invention. These compounds include such substances as the halides of the metals of Groups I–A and II–A of the Periodic Chart, such as lithium fluoride, lithium chloride, sodium fluoride, sodium chloride, potassium fluoride, potassium chloride, magnesium fluoride, magnesium chloride, calcium fluoride, calcium chloride, etc. Of the above-mentioned metal halides, the fluorides, such as calcium fluoride, potassium fluoride, and sodium fluoride are preferred for recovering substantially anhydrous boron trifluoride, and the chlorides for recovering substantially anhydrous boron trichloride.

It is preferred to use metal halides as hereinabove mentioned as selective sorption agents inasmuch as the boron halide and trace quantities of water usually are removed and separated from the aromatic hydrocarbon liquid recycle stream. Suitable aromatic hydrocarbons for use in the present invention include benzene, toluene, ortho-xylene, meta-xylene, para-xylene, ethylbenzene, ortho-ethyltoluene, meta-ethyltoluene, para-ethyltoluene, 1,2,3-trimethylbenzene, 1,2,4-trimethylbenzene, 1,3,5-trimethylbenzene, normal propylbenzene, iso-propylbenzene, etc. Preferred aromatic hydrocarbons are the monocyclic aromatic hydrocarbons, that is, the benzene hydrocarbons. Higher molecular weight alkyl aromatic hydrocarbons are also suitable. These include those aromatic hydrocarbons such as are produced by the alkylation of aromatic hydrocarbons with olefin polymers. Such products are frequently referred to in the art as alkylate, and include hexylbenzene, nonylbenzene, dodecylbenzene, pentadecylbenzene, hexyltoluene, nonyltoluene, dodecyltoluene, pentadecyltoluene, etc. Very often alkylate is obtained as a high boiling fraction in which the alkyl group attached to the aromatic nucleus varies in size from about $C_9$ to $C_{18}$. Other suitable aromatic hydrocarbons, which at specified sorption conditions, depending on melting point of the aromatic chosen, would be in liquid form, would include those aromatic hydrocarbons with two or more aryl groups such as diphenyl, diphenylmethane, triphenyl, triphenylmethane, fluorene, stilbene, etc. Examples of other aromatic hydrocarbons within the scope of this invention at specified sorption conditions, depending on melting point of the aromatic chosen, which would be in liquid form, would include those containing condensed benzene rings. These include naphthalene, anthracene, phenanthrene, naphthacene, rubrene, etc. Of the above-mentioned liquid aromatic hydrocarbons that could be utilized in the process of this invention, the benzene hydrocarbons are preferred, and of the preferred benzene hydrocarbons, benzene itself is particularly preferred.

In accordance with the process of the present invention, the removal of boron halide and trace quantities of water from an aromatic hydrocarbon liquid recycle stream containing the same is effected by contacting said recycle stream with a boron halide sorbent comprising a metal halide at a temperature of from about 75° C. or lower to about 300° C. or higher and preferably from about 120° C. to about 225° C., although the exact temperature needed will depend upon the particular aromatic hydrocarbon liquid recycle stream to be purified and the particular metal halide utilized. The lower temperature limit is one at which the metal haloborate hydrate becomes unstable and the boron halide complex or haloborate is stable. The upper temperature limit lies below the decomposition temperature of the boron halide complex. The sorption process is usually carried out at a pressure of from about atmospheric to about 200 atmospheres. The pressure utilized is usually selected to effect the desired selective sorption.

Dehydration of the effluent from said sorbing step is carried out by conventional means, for example, by distillation, use of molecular sieves or other desiccants, and the like, whereby the emergent stream is free from both water and boron halide and may thereafter be used, for example, without fouling of process equipment. The sorption bed is then periodically regenerated for use by heating the boron halide-saturated metal halide to a temperature above 250° C., and preferably about 300° C., where boron halide is evolved and the metal halide regenerated for re-use. The decomposition of the boron halide-saturated metal halide may be conducted in the presence of the dehydrated aromatic hydrocarbon liquid recycle stream if so desired.

In separating the hereinbefore mentioned boron halide and trace quantities of water from an aromatic hydrocarbon liquid recycle stream with the type of sorption media herein described, either batch or continuous operations may be employed. The actual operation of the process may be either upflow or downflow. The details of processes of this general character are familiar to those skilled in the art and any necessary additions or modifications of the above general procedures will be more or less obvious and can be made without departing from the broad scope of this invention.

The process of the present invention is illustrated by the following examples which are introduced for the purpose of illustration and with no intention of unduly limiting the generally broad scope of the invention.

*Example I*

This example illustrates the effect of the presence of trace quantities of water in process streams during the production of alkylated aromatics. The processing unit consisted of liquid and gas charge pumps, reactors, high pressure gas separators, pressure controllers, boron trifluoride treating system, feed pretreating system, fractionating columns, and liquid and gas collection systems. The catalyst charged into the reactor comprised a boron trifluoride-modified substantially anhydrous inorganic oxide, namely boron trifluoride-modified alumina. The unit was started up according to standard procedures so that ethylbenzene was produced. Substantially pure boron trifluoride was charged to the unit in sufficient quantity along with substantially anhydrous benzene and ethylene so that the benzene was converted to ethylbenzene. Additional boron trifluoride was added as needed to maintain good conversion. Operating temperatures were held at the minimum consistent with good conversion. The operating pressure was selected so that benzene was kept substantially in the liquid phase. The aromatic to olefin ratio was kept at a maximum at all times consistent with the equipment limitations, in order that few polyethylbenzenes should form. The fractionation section first separated part of the benzene recycle by flash and then the remainder by fractionation. The maximum recycle possible was flashed because of the lower heat requirement for flashing until the ethylbenzene and heavier products present became a contamination factor. Most of the boron trifluoride present was in the effluent vapors. Part of this boron trifluoride was condensed with the benzene recycle and returned to the reactor. The remaining boron trifluoride passed into the boron trifluoride treating system where it was absorbed and returned to the reactor by compressor after being stripped from the absorbent. The liquid from the hot flash was sent to the benzene fractionating column where after removal of the remaining recycle benzene in the benzene column, the ethylbenzene and heavier products were fractionated into an ethylbenzene cut in the overhead of the ethylbenzene column, and a bottom cut. The overhead was sent to storage. The fractionator bottoms were recycled back to a second reactor where the polyethylbenzenes were transalkylated to produce ethylbenzene.

During the production of ethylbenzene in the hereinabove outlined process flow scheme, it was observed that trace quantities of water were encountered in the liquid benzene recycle process stream per se and as coordination compounds of the boron trifluoride depending upon the amount of water present. The overall efficiency of the alkylation process decreased as the concentration of these compounds became higher. Continued formation and accumulation of these compounds within the process streams, and particularly in the recycle benzene stream returning to the reactor caused the eventual shut-down of the plant.

*Example II*

This example illustrates the separation of boron halide and trace quantities of water from the aromatic hydrocarbon liquid recycle stream during the production of alkylated aromatics. The same processing unit described in Example I was also utilized for the experiment described in this example.

This process flow scheme was modified so that a sorption zone containing calcium fluoride deposited on high surface area charcoal was introduced into the liquid benzene recycle stream that contained boron trifluoride and trace quantities of water. A pressure of 150 p.s.i.g. was selected to effect the desired sorption and this pressure was held constant throughout the entire experiment. For a period of 230 hours, the sorption zone operated efficiently at 150° C. and 1.7 benzene LHSV as evidenced by analyses of the effluent from the sorption zone. Water was removed from the effluent by conventional means, that is, by molecular sieves inasmuch as sorption of the water by the calcium fluoride was negligible at this temperature, while boron fluoride was sorbed. At the 230 hour mark in the experiment, it become apparent from the analyses of the effluent that the calcium fluoride was becoming saturated with the boron and fluoride present in the benzene inasmuch as larger amounts of said boron and fluoride were appearing in the effluent. Regeneration of the sorbent was attempted. The sorption zone was by-passed, depressured, and a stream of substantially anhydrous nitrogen was passed through the sorption zone. The boron fluoride-saturated sorbent was then heated to 350° C. and substantially anhydrous boron trifluoride was evolved and recovered for re-use and recycle to the alkylation process and the calcium fluoride was thereby regenerated for re-use. Recovery of the boron trifluoride evolved was in excess of 90%. The sorption zone was placed back on stream and the experiment was continued for an additional 61 hours at 150 p.s.i.g., 150° C. and 1.7 benzene LHSV. The regenerated sorbent sorbed the same amount of boron and fluoride as did the fresh calcium fluoride originally. Water was again removed from the effluent by conventional means. The temperature of the sorption zone was then increased to 200° C. and held there for 29 hours. It was observed from analyses of the effluent that the boron fluoride broke through the sorbent. Temperatures were dropped from 200° C. to 150° C. and held there for 60 hours, whereupon the calcium fluoride regained its initial activity and selectivity and substantial sorption of the boron and fluoride again occurred as evidenced by the analyses of the effluent from the sorption zone. The sorbent was again regenerated at the 390 hour mark in the experiment, utilizing the method of the first regeneration but utilizing a temperature of from about 225° C. to about 325° C. The experiment was continued with the re-regenerated sorbent at operating conditions of 150 p.s.i.g., 125° C., and 1.7 benzene LHSV, for an additional 234 hours. The selectivity and activity of the re-regenerated sorbent was again the same as for the fresh calcium fluoride. The experiment was completed at the 624 hour mark. The calcium fluoride was again regenerated using the method of the first regeneration but at a temperature of from about 325° C. to about 350° C.

As can be seen in Table I, a total of 3,626 milligrams of boron and 21,310 milligrams of fluoride were recovered over the 624 hours of the run. This was equivalent to 92.2 weight percent total boron recovery and 97.3 weight percent total fluoride recovery over the duration of the run.

The overall efficiency of the alkylation process was maintained at the desired level during use of the sorption zone containing the calcium fluoride impregnated on high surface area charcoal in the benzene recycle stream as evidenced by the continuous production of ethylbenzene at the desired conversion until the plant was shut down at the completion of the run. The substantially anhydrous boron trifluoride recovered was recycled to the reactor for further re-use as was the dehydrated benzene.

Similar results are also obtained utilizing as sorption agents lithium fluoride, sodium fluoride, potassium fluoride and magnesium fluoride impregnated on high surface area charcoal.

TABLE I.—UTILIZATION OF CALCIUM FLUORIDE AS SORPTION AGENT

| | |
|---|---|
| Accumulated hours | 624. |
| Boron halide sorbent | Calcium fluoride on charcoal. |
| Boron halide present in system | Boron trifluoride. |
| Fluid organic compound containing $BF_3$ and $H_2O$ | Benzene. |
| Sorber pressure, p.s.i.g. | 150. |
| Sorber temperature, ° C. | 125–200. |
| Benzene LHSV | 1.7. |
| Average concentration of $H_2O$ in benzene, p.p.m. (wt.) | 42. |
| Average concentration of $BF_3$ in benzene, p.p.m. (wt.) | 406. |
| Total boron sorbed, mg. | 3940. |
| Total boron recovered, mg. | 3626. |
| Percent total boron recovered | 92.2. |
| Total fluoride sorbed, mg. | 21,940. |
| Total fluoride recovered, mg. | 21,310. |
| Percent total fluoride recovered | 97.3. |

We claim as our invention:

1. In the alkylation of an aromatic hydrocarbon in a reaction zone in the presence of boron halide and a boron halide-modified substantially anhydrous inorganic oxide, the process which comprises withdrawing the resultant effluent from the reaction zone and separating therefrom an aromatic hydrocarbon liquid recycle stream containing a minor amount of boron halide and trace quantities of water, passing said recycle stream to a sorption zone and therein contacting said recycle stream with a boron halide sorbent comprising a metal halide, selectively sorbing without substantial sorption of water at least a portion of said boron halide with said metal halide at a temperature at which the hydrate of the resulting metal haloborate is unstable and said metal haloborate is stable, subsequently recovering substantially anhydrous boron halide from said metal haloborate at a temperature above said sorption temperature, withdrawing from said sorption zone a water-containing aromatic hydrocarbon effluent of reduced boron halide content and then dehydrating said water-containing effluent, and separately returning the thus purified recycle stream and the substantially anhydrous boron halide to the reaction zone.

2. In the alkylation of an aromatic hydrocarbon in a reaction zone in the presence of boron trifluoride and a boron trifluoride-modified substantially anhydrous inorganic oxide, the process which comprises withdrawing the resultant effluent from the reaction zone and separating therefrom an aromatic hydrocarbon liquid recycle stream containing a minor amount of boron trifluoride and trace quantities of water, passing said recycle stream to a sorption zone and therein contacting said recycle stream with a boron trifluoride sorbent comprising a metal halide, selectively sorbing without substantial sorption of water at least a portion of said boron trifluoride with said metal halide at a temperature at which the hydrate of the resulting metal haloborate is unstable and said metal haloborate is stable, subsequently recovering substantially anhydrous boron trifluoride from said metal haloborate at a temperature above said sorption temperature, withdrawing from said sorption zone a water-containing aromatic hydrocarbon effluent of reduced boron trifluoride content and then dehydrating said water-containing effluent, and separately returning the thus purified recycle stream and the substantially anhydrous boron trifluoride to the reaction zone.

3. In the alkylation of an aromatic hydrocarbon in a reaction zone in the presence of boron trifluoride and a boron trifluoride-modified substantially anhydrous inorganic oxide, the process which comprises withdrawing the resultant effluent from the reaction zone and separating therefrom a benzene hydrocarbon liquid recycle stream containing a minor amount of boron trifluoride and trace quantities of water, passing said recycle stream to a sorption zone and therein contacting said recycle stream with a boron trifluoride sorbent comprising a metal fluoride, selectively sorbing without substantial sorption of water at least a portion of said boron trifluoride with said metal fluoride at a temperature at which the hydrate of the resulting metal haloborate is unstable and said metal haloborate is stable, subsequently recovering substantially anhydrous boron trifluoride from said metal fluoborate at a temperature above said sorption temperature, withdrawing from said sorption zone a water-containing benzene hydrocarbon effluent of reduced boron trifluoride content and then dehydrating said water-containing effluent, and separately returning the thus purified benzene hydrocarbon liquid recycle stream and the substantially anhydrous boron trifluoride to the reaction zone.

4. In the alkylation of an aromatic hydrocarbon in a reaction zone in the presence of boron trifluoride and a boron trifluoride-modified substantially anhydrous inorganic oxide, the process which comprises withdrawing the resultant effluent from the reaction zone and separating therefrom a liquid benzene recycle stream containing a minor amount of boron trifluoride and trace quantities of water, passing said recycle stream to a sorption zone and therein contacting said recycle stream with a boron trifluoride sorbent comprising a metal fluoride, selectively sorbing without substantial sorption of water at least a portion of said boron trifluoride with said metal fluoride at a temperature at which the hydrate of the resulting metal fluoborate is unstable and said metal fluoborate is stable, subsequently recovering substantially anhydrous boron trifluoride from said metal fluorborate at a temperature above said sorption temperature, withdrawing from said sorption zone a water-containing benzene effluent of reduced boron trifluoride content and then dehydrating said water-containing effluent, and separately returning the thus purified benzene recycle stream and the substantially anhydrous boron trifluoride to the reaction zone.

5. In the alkylation of an aromatic hydrocarbon in a reaction zone in the presence of boron trifluoride and a boron trifluoride-modified substantially anhydrous inorganic oxide, the process which comprises withdrawing the resultant effluent from the reaction zone and separating therefrom a liquid benzene recycle stream containing a minor amount of boron trifluoride and trace quantities of water, passing said recycle stream to a sorption zone and therein contacting said recycle stream with a boron trifluoride sorbent comprising calcium fluoride, selectively sorbing without substantial sorption of water at least a portion of said boron trifluoride with said calcium fluoride at a temperature of from about 75° C. to about 300° C. at which temperature the hydrate of the resulting calcium fluoborate is unstable and said calcium fluoborate is stable, subsequently recovering substantially anhydrous boron trifluoride from said calcium fluoborate at a temperature above said sorption temperature, then dehydrating said water-containing effluent, and separately returning the thus purified benzene recycle stream and the substantially anhydrous boron trifluoride to the reaction zone.

6. In the alkylation of an aromatic hydrocarbon in a reaction zone in the presence of boron trifluoride and a boron trifluoride-modified substantially anhydrous inorganic oxide, the process which comprises withdrawing the resultant effluent from the reaction zone and separating therefrom a liquid benzene recycle stream containing a minor amount of boron trifluoride and trace quantities of water, passing said recycle stream to a sorption zone and therein contacting said recycle stream with a boron trifluoride sorbent comprising sodium fluoride, selectively sorbing without substantial sorption of water at least a portion of said boron trifluoride with said sodium fluoride at a temperature of from about 75° C. to about 300° C. at which temperature the hydrate of the resulting sodium fluoborate is unstable and said sodium fluoborate is stable, subsequently recovering substantially anhydrous boron trifluoride from said sodium fluorborate at a temperature above said sorption temperature, then dehydrating said water-containing effluent, and separately returning the thus purified benzene recycle stream and the substantially anhydrous boron trifluoride to the reaction zone.

7. In the alkylation of an aromatic hydrocarbon in a reaction zone in the presence of boron trifluoride and a boron trifluoride-modified substantially anhydrous inorganic oxide, the process which comprises withdrawing the resultant effluent from the reaction zone and separating therefrom a liquid benzene recycle stream containing a minor amount of boron trifluoride and trace quantities of water, passing said recycle stream to a sorption zone and therein contacting said recycle stream with a boron trifluoride sorbent comprising potassium fluoride, selectively sorbing at least a portion of said boron trifluoride with said potassium fluoride without substantial sorption of water at a temperature of from about 75° C. to about 300° C. at which temperature the hydrate of the resulting potassium fluoborate is unstable and said potassium fluoborate is stable, subsequently recovering substantially anhydrous boron trifluoride from said potassium fluoborate at a temperature above said sorption temperature, then dehydrating said water-containing effluent, and separately returning the thus purified benzene recycle stream and the substantially anhydrous boron trifluoride to the reaction zone.

References Cited by the Examiner
UNITED STATES PATENTS

| | | | |
|---|---|---|---|
| 2,135,460 | 11/1938 | Loder | 23—205 |
| 2,440,784 | 5/1948 | Perdew | 208—188 |
| 2,628,991 | 2/1953 | Schneider et al. | 23—205 X |
| 2,995,611 | 8/1961 | Linn et al. | 260—671 |
| 3,203,764 | 8/1965 | Linn et al. | 23—205 |

DELBERT E. GANTZ, *Primary Examiner.*

C. R. DAVIS, *Assistant Examiner.*